United States Patent
Baca et al.

(10) Patent No.: US 9,928,413 B2
(45) Date of Patent: Mar. 27, 2018

(54) TECHNIQUES FOR USER AUTHENTICATION ON A COMPUTING DEVICE VIA PATTERN RECOGNITION

(71) Applicant: Intel Corporation, Santa Clara, CA (US)

(72) Inventors: Jim S. Baca, Corrales, NM (US); David Stanasolovich, Albuquerque, NM (US); Mark H. Price, Placitas, NM (US); Joshua Boelter, Portland, OR (US); Tobias Kohlenberg, Portland, OR (US)

(73) Assignee: INTEL CORPORATION, Santa Clara, CA (US)

( * ) Notice: Subject to any disclaimer, the term of this patent is extended or adjusted under 35 U.S.C. 154(b) by 82 days.

(21) Appl. No.: 14/129,939

(22) PCT Filed: Jun. 13, 2013

(86) PCT No.: PCT/US2013/045567
§ 371 (c)(1),
(2) Date: Aug. 12, 2014

(87) PCT Pub. No.: WO2014/200485
PCT Pub. Date: Dec. 18, 2014

(65) Prior Publication Data
US 2015/0003693 A1    Jan. 1, 2015

(51) Int. Cl.
*G06K 9/00* (2006.01)
*G06K 9/22* (2006.01)
(Continued)

(52) U.S. Cl.
CPC ......... *G06K 9/00382* (2013.01); *G06F 21/00* (2013.01); *G06F 21/31* (2013.01); *H04W 12/06* (2013.01); *G06F 2221/2139* (2013.01)

(58) Field of Classification Search
USPC ............. 382/124, 116, 313; 713/323; 126/4; 340/5.83
See application file for complete search history.

(56) References Cited

U.S. PATENT DOCUMENTS 6,141,436 A * 10/2000 Srey ................... G06K 9/00013
340/5.74
6,320,974 B1 * 11/2001 Glaze ................. G06K 9/00013
340/5.8

(Continued)

FOREIGN PATENT DOCUMENTS

KR    20060073293    6/2006
KR    20110072220    6/2011

(Continued)

OTHER PUBLICATIONS

International Search Report and Written Opinion received for PCT Patent Application No. PCT/US2013/045567, dated Mar. 6, 2014, 14 pages.

*Primary Examiner* — Kathleen Y Dulaney

(57) ABSTRACT

Various embodiments are generally directed to an apparatus, method and other techniques for detecting one or more inputs on a back side of a housing an determining a pattern based on the detected one or more inputs on the back side of the housing. Once a pattern is determined, a pattern characteristic based on the pattern may be determined and a user may be authenticated based on a comparison of the pattern characteristic and stored data. Other embodiments are described and claimed.

19 Claims, 9 Drawing Sheets

(51) Int. Cl.
*G06F 7/04* (2006.01)
*G06F 1/00* (2006.01)
*G05B 19/00* (2006.01)
*G06F 21/00* (2013.01)
*G06F 21/31* (2013.01)
*H04W 12/06* (2009.01)

(56) References Cited

U.S. PATENT DOCUMENTS

| | | | | |
|---|---|---|---|---|
| 7,446,658 | B2* | 11/2008 | Panotopoulos | G06K 19/0705 340/10.1 |
| 7,831,932 | B2* | 11/2010 | Josephsoon | G06F 3/011 345/156 |
| 8,312,291 | B2* | 11/2012 | Golic | G06K 9/00288 382/115 |
| 9,013,581 | B2* | 4/2015 | Koh | H04N 5/232 348/207.1 |
| 2002/0081005 | A1* | 6/2002 | Black | G06F 3/03545 382/124 |
| 2004/0204202 | A1* | 10/2004 | Shimamura | H04M 1/0235 455/575.1 |
| 2005/0111709 | A1* | 5/2005 | Topping | F41A 17/066 382/124 |
| 2006/0034499 | A1* | 2/2006 | Shinoda | G06K 9/00013 382/124 |
| 2010/0235667 | A1* | 9/2010 | Mucignat | G06F 1/3203 713/323 |
| 2012/0098948 | A1* | 4/2012 | Lee | A61B 5/1172 348/77 |
| 2012/0219194 | A1 | 8/2012 | Monden | |
| 2012/0235790 | A1* | 9/2012 | Zhao | G06F 21/32 340/5.83 |
| 2012/0235912 | A1* | 9/2012 | Laubach | G06F 3/04895 345/163 |
| 2013/0155070 | A1* | 6/2013 | Luo | G06T 11/20 345/441 |
| 2013/0223696 | A1* | 8/2013 | Azar | G06K 9/00892 382/118 |
| 2013/0324152 | A1* | 12/2013 | Lee | H04W 64/006 455/456.1 |
| 2014/0040989 | A1* | 2/2014 | Davis | H04L 63/08 726/4 |
| 2014/0059673 | A1* | 2/2014 | Azar | G06F 21/32 726/19 |
| 2014/0270415 | A1* | 9/2014 | Alameh | G06K 9/00026 382/124 |
| 2014/0282877 | A1* | 9/2014 | Mahaffey | H04L 63/0853 726/3 |
| 2015/0324570 | A1* | 11/2015 | Lee | G06K 9/3208 382/124 |
| 2015/0347807 | A1* | 12/2015 | Weber | G06K 9/0002 382/124 |
| 2016/0034738 | A1* | 2/2016 | Luo | G06K 9/001 382/125 |

FOREIGN PATENT DOCUMENTS

| | | |
|---|---|---|
| KR | 20110080871 | 7/2011 |
| KR | 20110095565 | 8/2011 |

* cited by examiner

*100*

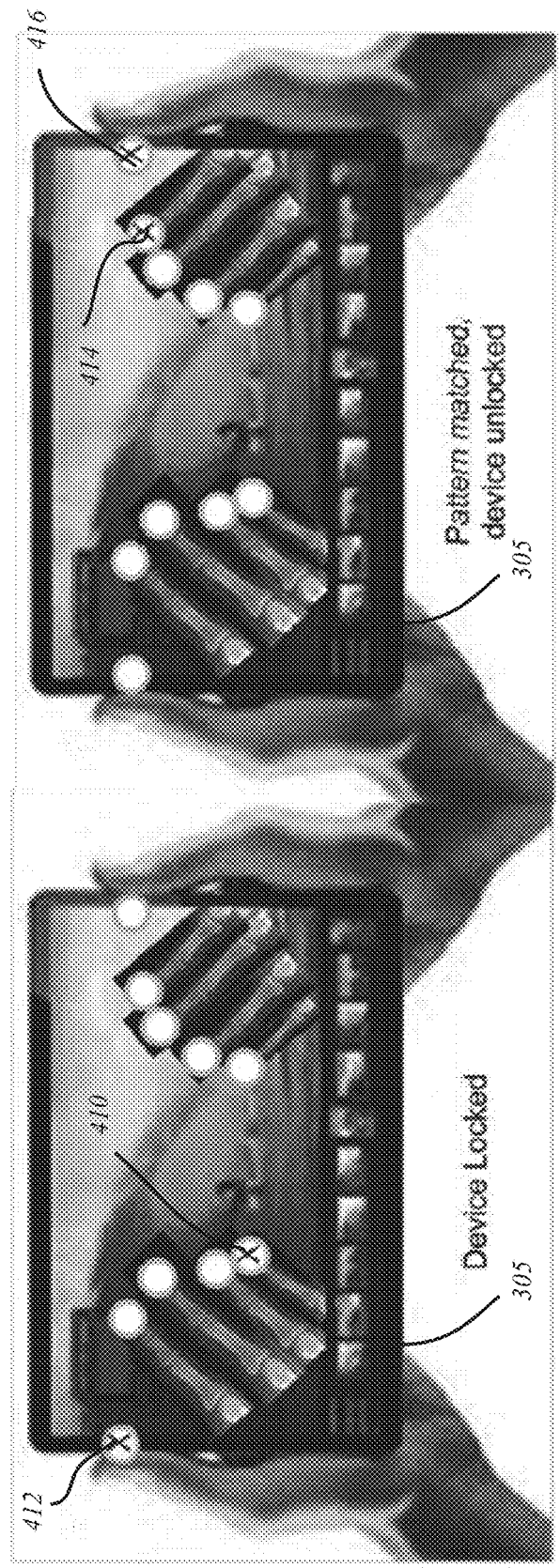

700

DETECT ONE OR MORE INPUTS ON A BACK SIDE OF A HOUSING
705

DETERMINE A PATTERN BASED ON THE DETECTED ONE OR MORE INPUTS ON THE BACK SIDE OF THE HOUSING
710

DETERMINE A PATTERN CHARACTERISTIC BASED ON THE PATTERN, THE PATTERN CHARACTERISTIC TO REPRESENT THE PATTERN
715

AUTHENTICATE A USER BASED ON A COMPARISON OF THE PATTERN CHARACTERISTIC AND STORED DATA
720

*FIG. 7*

TECHNIQUES FOR USER AUTHENTICATION ON A COMPUTING DEVICE VIA PATTERN RECOGNITION

TECHNICAL FIELD

Embodiments described herein generally relate to pattern recognition and authentication on a computing device. In particular, embodiments relate to authenticating a user of a computing device via detecting one or more inputs on a housing and recognizing unique characteristics and patterns of the one or more inputs.

BACKGROUND

Computing devices, such as mobile phones, cell phones and smart phones, are becoming more ubiquitous and versatile. As demand grows, computing device design also grows to support more security features, such as a device lock. When a user is not using the computing device, the user may lock the computing device to prevent others from having full access to all its features and information. Computing devices use many different methods to authenticate a user to allow access to the device and its contents. Some of these methods including entering a text or numerical password, fingerprint entry using a biometric sensor, or touching a pattern on a touch screen display. When the user wishes to use the computing device, the user may unlock the phone by entering an authentication code using one of these methods.

However, it may not always be safe for the user to unlock the phone in this manner. For example, other people may be looking at the user to steal the code as the user enters it. Furthermore, the user may leave prints or smudges on a display screen that another person could use to steal the code.

BRIEF DESCRIPTION OF THE DRAWINGS

FIGS. 4A-D illustrate an embodiment of a fourth computing system.
FIG. 7 illustrates an embodiment of a third logic flow.

DETAILED DESCRIPTION

Figure 1:
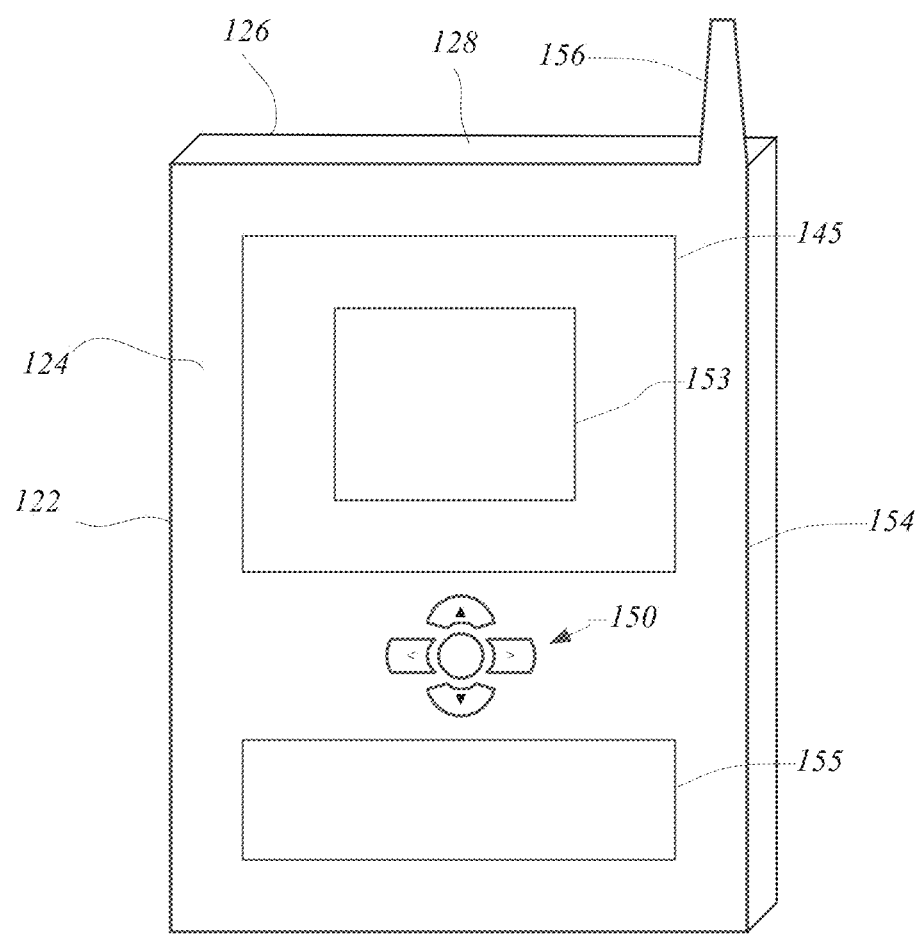
FIG. 1 illustrates an embodiment of a first computing system.

Various embodiments are generally directed to authenticating a user via a pattern entered by the user. Some embodiments are particularly directed to a computing device having a sensor component to sense one or more inputs made by a user. The one or more inputs may be inputted by the user and sensed on the back side of a housing of the computing device. Unique characteristics and patterns of the one or more inputs may be recognized by the computing device. For example, in various embodiments, the computing device and components may recognize a pattern and unique characteristics of a user's finger and hand placement on the back side of the device.

These unique characteristics and patterns may include but are not limited to the distance from the edge of the computing device to one or more finger placements on the device, the distance between the fingers, the order in which the fingers are placed on the device, etc. In other embodiments an amount of pressure of one or more fingers placed on the housing may be recognized. These and other authentication methods using a unique form of pattern and shaped-based authentication may improve computing device user authentication.

Various embodiments may directed to authentication using a combination of unique characteristics and patterns, such as finger placement geometry, finger placement order, finger placement location and finger placement pressure. The embodiments are not limited to only detecting finger placement. Other body parts, such as a user's palm, and instruments, such as a stylus, may be also be used and detected by the sensor component. Furthermore, while the detection is described herein as occurring on the back side of the housing for purposes of illustrations, it should be understood that in some embodiments the sensor component may detect one or more inputs on the front side or one of the connecting sides of the housing.

Once the computing device recognizes the unique characteristics and pattern of the one or more inputs, a user may be authenticated using the unique characteristics and pattern. For example, a pattern characteristic, such as a fuzzy hash, may be determined from the pattern and compared with an authentication pattern characteristic, such as authentication fuzzy hash created during a registration process. If the pattern characteristic matches or approximately matches the authentication pattern characteristic, the user will be authenticated and the device will be unlocked for use. The pattern characteristic may approximately match the authentication pattern characteristic based on a probability or a confidence factor such as a 90% or 95%. The probability or confidence factor may be predetermined by a user or may be a default setting.

Various embodiments may also include carry authentication including a carry authentication pattern and a carry authentication pattern characteristic. Carry authentication may be used once a user has been fully authenticated using the full authentication pattern. Carry authentication allows a device owner to proceed from a state of using the device, to carrying the device for a duration longer than a locked time threshold and then immediately restart using the device without performing a full authentication. Carry authentication may include a simpler form of a pattern or unique characteristics to maintain user authentication while the user is moving with the device. For example, the carry authentication may include recognizing a user's hold or grip on the device as it is being carried. The carry authentication capability links the initial full authentication, use of the device and carry authentication pattern to determine if the owner is still in possession of the computing device through a carry authentication chain. Additional embodiments are described herein.

Full authentication using unique characteristics of a user holding a device and carry authentication provide a new and novel set of highly friendly capabilities for authentication of a computing device by recognizing patterns that are more natural when holding or grasping the computing device. Moreover, these techniques provide a safer means for authenticating a user by enabling a user to enter an authentication password in a more natural manner that may be harder to steal.

With general reference to notations and nomenclature used herein, the detailed description that follows may be presented in terms of program procedures executed on a computer or network of computers. These procedural descriptions and representations are used by those skilled in the art to most effectively convey the substance of their work to others skilled in the art.

A procedure is here and is generally conceived to be a self-consistent sequence of operations leading to a desired result. These operations are those requiring physical manipulations of physical quantities. Usually, though not necessarily, these quantities take the form of electrical, magnetic or optical signals capable of being stored, transferred, combined, compared, and otherwise manipulated. It proves convenient at times, principally for reasons of common usage, to refer to these signals as bits, values, elements, symbols, characters, terms, numbers, or the like. It should be noted, however, that all of these and similar terms are to be associated with the appropriate physical quantities and are merely convenient labels applied to those quantities.

Further, the manipulations performed are often referred to in terms, such as adding or comparing, which are commonly associated with mental operations performed by a human operator. No such capability of a human operator is necessary, or desirable in most cases, in any of the operations described herein that form part of one or more embodiments. Rather, the operations are machine operations. Useful machines for performing operations of various embodiments include general-purpose digital computers or similar devices.

Various embodiments also relate to apparatus or systems for performing these operations. This apparatus may be specially constructed for the required purpose or it may comprise a general-purpose computer as selectively activated or reconfigured by a computer program stored in the computer. The procedures presented herein are not inherently related to a particular computer or other apparatus. Various general-purpose machines may be used with programs written in accordance with the teachings herein, or it may prove convenient to construct more specialized apparatus to perform the required method. The required structure for a variety of these machines will appear from the description given.

Reference is now made to the drawings, wherein like reference numerals are used to refer to like elements throughout. In the following description, for purposes of explanation, numerous specific details are set forth in order to provide a thorough understanding thereof. It may be evident, however, that the novel embodiments can be practiced without these specific details. In other instances, well-known structures and devices are shown in block diagram form in order to facilitate a description thereof. The intention is to cover all modifications, equivalents, and alternatives consistent with the claimed subject matter.

FIG. 1 illustrates embodiments of computing system 100. In some embodiments, for example, device 100 may be implemented as a mobile computing device having wireless capabilities. A mobile computing device may refer to any device having a processing system and a mobile power source or supply, such as one or more batteries, for example.

As described above, examples of a mobile computing device may include a personal computer (PC), laptop computer, ultra-laptop computer, netbook computer, ultrabook computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, and so forth.

Examples of a mobile computing device also may include computers that are arranged to be worn by a person, such as a wrist computer, finger computer, ring computer, eyeglass computer, belt-clip computer, arm-band computer, shoe computers, clothing computers, and other wearable computers. In embodiments, for example, a mobile computing device may be implemented as a smart phone capable of executing computer applications, as well as voice communications and/or data communications. Although some embodiments may be described with a mobile computing device implemented as a smart phone by way of example, it may be appreciated that other embodiments may be implemented using other wireless mobile computing devices as well. The embodiments are not limited in this context.

As shown in FIG. 1, device 100 may include a housing 122, a display 145, a navigation controller 150, an I/O device 155, and an antenna 156. The housing may include a front side 124, a back side 126 and sides 128 to couple the front side 124 to the back side 126. The connecting sides may include a top side, a bottom side, a left side and a right side. Display 145 may include any suitable display unit for displaying information appropriate for a mobile computing device. The navigation controller 150 may include one or more navigation features which may be used to interact with the device 100. I/O device 155 may include any suitable I/O device for entering information into a mobile computing device. Examples for I/O device 155 may include an alpha-numeric keyboard, a numeric keypad, a touch pad, input keys, buttons, switches, rocker switches, microphones, speakers, voice recognition device and software, and so forth. Information also may be entered into device 100 by way of microphone. Such information may be digitized by a voice recognition device. The embodiments are not limited in this context.

Figure 2:
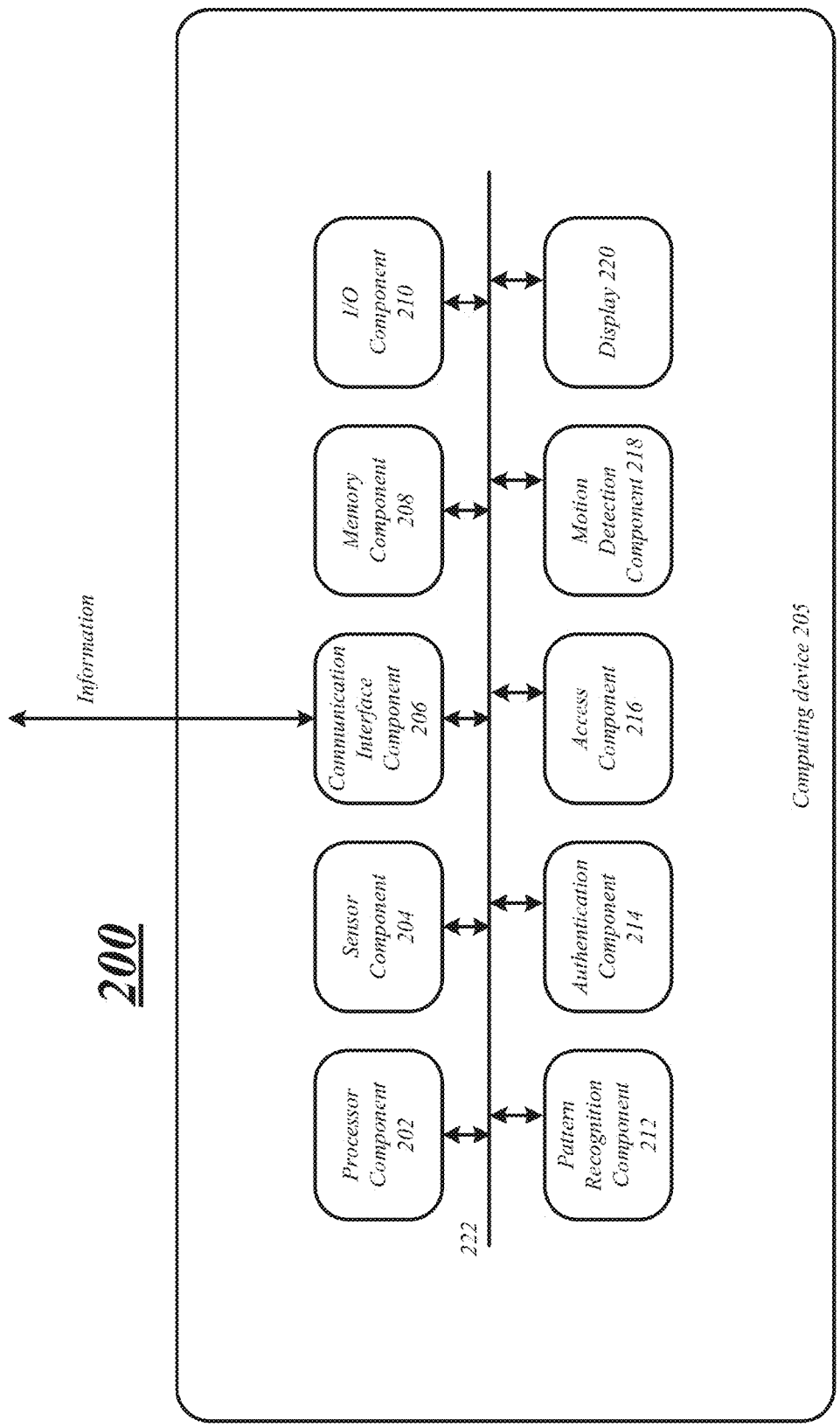
FIG. 2 illustrates an embodiment of a second computing system.

FIG. 2 illustrates one embodiment of a computing system, in particular, computing device 205. In various embodiments, computing device 205 may be representative of a computing system suitable for use with one or more embodiments described herein, such as, logic flow 500 of FIG. 5, logic flow 600 of FIG. 6, and/or logic flow 700 of FIG. 7. The embodiments are not limited in this respect.

As shown in FIG. 2, computing device 205 may include multiple elements. One or more elements may be implemented using one or more circuits, components, registers, processors, software subroutine modules, or any combination thereof, as desired for a given set of design or performance constraints. Although FIG. 2 shows a limited number of elements in a certain topology by way of example, it can be appreciated that more or less elements in any suitable topology may be used in computing device 205 as desired for a given implementation. The embodiments are not limited in this context.

In various embodiments, computing device 205 may include a processor component 202. Processor component 202 may be one or more of any type of computational element, such as but not limited to, a microprocessor, a processor, central processing unit, digital signal processing unit, dual core processor, mobile device processor, desktop processor, single core processor, a system-on-chip (SoC) device, complex instruction set computing (CISC) microprocessor, a reduced instruction set (RISC) microprocessor, a very long instruction word (VLIW) microprocessor, or any other type of processor or processing circuit on a single chip or integrated circuit. The processor component 202 may be connected to and communicate with the other elements of the computing system via an interconnect 222, such as one or more buses, control lines, and data lines.

In some embodiments, computing device 205 may include a sensor component 204. The sensor component 204 may include any hardware or logic to detect one or more touches or inputs on or near the housing 122 including the front side 124, the back side 126 and the connecting sides 128. The one or more inputs on the housing may occur separately, simultaneously and/or sequentially. The touches or inputs may be recognized by the sensor component 204 located within the housing 122. The sensor component 204 monitors touches that occur on the housing 122 and produces signals indicative thereof. The sensor component 204 may for example include one or more touch sensors based on resistive touch sensing, capacitive touch sensing, optical touch sensing, surface acoustic wave touch sensing, thermal sensing and/or the like.

In embodiments, the computing device 205 may include a communication interface component 206. The communication interface component 206 includes any device and circuitry for processing information or communications over wireless and wired connections. For example, the communication interface component 206 may include a receiver, a transmitter, one or more antennas, and one or more Ethernet connections. The specific design and implementation of the communication interface component 206 may be dependent upon the communications network in which the computing device 205 is intended to operate. For example, the computing device 205 may include a communication interface component 206 designed to operate in GSM with General Packet Radio Service (GPRS) systems (GSM/GPRS), CDMA/1xRTT systems, Enhanced Data Rates for Global Evolution (EDGE) systems, Evolution Data Only or Evolution Data Optimized (EV-DO) systems, Evolution For Data and Voice (EV-DV) systems, High Speed Downlink Packet Access (HSDPA) systems, High Speed Uplink Packet Access (HSUPA), and so forth. data communications networks, and also designed to operate with any of a variety of voice communications networks, such as may include Code Division Multiple Access (CDMA) systems, Global System for Mobile Communications (GSM) systems, North American Digital Cellular (NADC) systems, Time Division Multiple Access (TDMA) systems, Extended-TDMA (E-TDMA) systems, Narrowband Advanced Mobile Phone Service (NAMPS) systems, third generation (3G) systems such as Wide-band CDMA (WCDMA), CDMA-2000, Universal Mobile Telephone System (UMTS) systems, and so forth. Other types of data and voice networks, both separate and integrated, may also be utilized with computing device 205. The computing device 205 may also be compliant with other communications standards such as 3GSM, 3GPP, UMTS, 4G, etc. In some embodiments, the computing device 205 may be designed to operate in a plurality of communications networks and is not limited to a specific network.

In various embodiments, the communication interface component 206 may include one or more I/O controllers (not shown) to output any signals and information. The I/O controller may enable communication over wireless and wired connections. In various embodiments, the I/O controller may be separate component or module of computing device 205.

In one embodiment, computing device 205 may include a memory component 208 to couple to processor component 202. Memory component 208 may be coupled to processor component 202 via interconnect 222, or by a dedicated communications bus between processor component 202 and memory component 208, as desired for a given implementation. Memory component 208 may be implemented using any machine-readable or computer-readable media capable of storing data, including both volatile and non-volatile memory. In some embodiments, the machine-readable or computer-readable medium may include a non-transitory medium. The embodiments are not limited in this context.

The memory component 208 can store data momentarily, temporarily, or permanently. The memory component 208 stores instructions and data for computing device 205. The memory component 208 may also store temporary variables or other intermediate information while the processor component 202 is executing instructions. The memory component 208 is not limited to storing the above discussed data; the memory component 208 may store any type of data.

In various embodiments, computing device 205 may include storage component 210. Storage component 210 may be implemented as a non-volatile storage device such as, but not limited to, a magnetic disk drive, optical disk drive, tape drive, an internal storage device, an attached storage device, flash memory, battery backed-up SDRAM (synchronous DRAM), and/or a network accessible storage device. In embodiments, storage component 210 may include technology to increase the storage performance enhanced protection for valuable digital media when multiple hard drives are included, for example. Further examples of storage component 210 may include a hard disk, floppy disk, Compact Disk Read Only Memory (CD-ROM), Compact Disk Recordable (CD-R), Compact Disk Rewriteable (CD-RW), optical disk, magnetic media, magneto-optical media, removable memory cards or disks, various types of DVD devices, a tape device, a cassette device, or the like. The embodiments are not limited in this context.

In various embodiments, computing device 205 may include a pattern recognition component 212 to determine a pattern and a pattern characteristic based on the pattern. The pattern recognition component 212 may be any software, hardware, logic, or combination thereof for determining the pattern and pattern characteristic. For example, the pattern recognition component 212 may be stored in memory component 208 or storage 210 and processed or executed by processor component 202. In other embodiments, the pattern recognition component 212 may be hardwired or hardcoded into one or more processing devices.

The pattern recognition component 212 may receive information or data from the sensor component 204 and the processor component 202 via interconnect 222 or through a direct connection. For example, the pattern recognition component 212 may receive one or more inputs received by the sensor component 204, however, the pattern recognition component 212 is not limited in this manner. In various embodiments, the pattern recognition component 212 may communicate information or data with any of the other components.

In various embodiments, the pattern recognition component 212 may determine a pattern based on one or more inputs detected by the sensor component 204. The pattern recognition component 212 may recognize a pattern or unique characteristics of a user's hand placement or touches on the computing device 205 including the front side 124 and the back side 126 of the housing 122 based on received inputs. For example, the pattern recognition component 212 may determine a pattern based on a distance between one or more edges 128 of the computing device 205 and one or more of the detected inputs based on a user's finger placement(s). In another example, the pattern recognition component 212 may determine the distance between one or more of the inputs or placement of the user's fingers on the computing device 205.

In another example, the pattern recognition component 212 may determine a pattern or unique characteristic based on an order in which one or more inputs are received. In various embodiments, the order may be based on particular fingers placed at particular locations in a sequence. In addition, the order may be based on only one of a user's fingers touching particular locations in a sequence. For example, a user may be able to touch or tap a pattern on the back side of the computing device with a single finger for authentication.

The pattern recognition component 212 may also determine a pattern or unique characteristics based on an amount of pressure received for one or more inputs. For example, the sensor component 204 may be able to determine an amount of pressure at a particular location of one or more inputs on the computing device 205 and housing 122. In various embodiments, the pattern recognition component 212 may determine the pattern based on an amount of pressure at one or more particular locations independent of which of a user's finger is used. For example, a user may use various fingers and touch the back side 126 of the housing 122 at particular locations with an amount of pressure for each location and a pattern will be detected. In the same example, a user may enter the same pattern with the same amount of pressure at the same location using only one finger, such as the index finger, and the pattern recognition component 212 will recognize the same pattern. The amount of pressure applied at different locations does not have to be the same and may be variable from location to location. Moreover, the amount of pressure may be the same at some locations and different at other locations. Various embodiments are not limited in this manner.

The pattern recognition component 212 may determine a pattern or unique characteristic based on a user's fingers and/or thumbs sizes. The sensor component 204 may detect the various sizes of a user's fingers and thumbs as inputs. In various embodiments, the pattern recognition component 212 may determine a pattern based on the particular sizes of the detected inputs at particular locations on the housing 122 of the computing device 205. For example, the pattern recognition component 212 may determine a pattern based on a user's index finger including the index finger's size and location and a user's thumb including the thumb's size at a particular location. Various embodiments are not limited in this manner and the pattern recognition component may detect any input and size of the input at any location.

In various embodiments, the pattern recognition component 212 may determine a pattern or unique characteristics based on a combination of the above-recited examples. For example, the pattern may be based on a combination of the distance between detected one or more inputs and the order in which they were received. In another example, the pattern may also be based on a combination of order in which one or more of the inputs were received and an amount of pressure for each of the one or more inputs. The pattern recognition component 212 may determine a pattern based on any combination of the above-discussed examples.

In some embodiments, the pattern recognition component 212 may determine a pattern based on one or more inputs received by the sensor component 204 on the back side 126 of the housing 122. For example, the pattern recognition component 212 may determine a pattern based on the sensed fingers on the back side 126 of the housing 122 when a user picks up the computing device 205. In addition, the pattern may also include one or more inputs on the front side 124 of the computing device 205. For example, the pattern recognition component 212 may determine a pattern based on the sensed fingers on the back side 126 of the housing 122 and a sensed thumb placement on the front side of 124 of the housing 122. As discussed above, the pattern may be based on any combination of characteristics, such as distance between inputs, relative distance, order, and pressure.

In various embodiments, the pattern recognition component 212 may determine a pattern characteristic based on the determined pattern. The pattern characteristic may be an alphanumeric representation of the pattern computationally determined and used for authentication. For example, the pattern characteristic may be a hash value or a fuzzy hash value determined by running the detected pattern through a fuzzy hash algorithm. Various embodiments are not limited in this manner, other techniques may also be used to determine the pattern characteristic, such as probability clouds.

In various embodiments, the computing device 205 may include an authentication component 214 to authenticate a user based on a comparison of a pattern characteristic and stored data. The stored data may include an authentication pattern and a pattern characteristic based on the authentication pattern a user entered during a registration process. In some embodiments, the stored data may have one or more authentication patterns and pattern characteristics unique for different users. During a registration process a number of users may create separate authentication patterns and pattern characteristics. For example, different users may enter different patterns for authentication and based on the pattern entered the user may only be permitted to access certain information. In some embodiments, the user may be able to enter a simple pattern, such as a single touch on the housing to unlock the device for emergency service (e.g., dialing 911) use. Further, as will be discussed in more detail below, the stored data may also include a carry authentication pattern and pattern characteristic to authenticate a user that has already been fully authenticated but has stopped using the device and may be carrying it to another location.

The authentication component 214 may communicate with any of the other components via interconnect 222. For example, the authentication component 214 may receive the pattern characteristic from the pattern recognition component 212 and the stored data from the memory component 208 and/or storage 210. The authentication component 214 may compare the received pattern characteristic with the stored data including an authentication pattern characteristic and determine if they match or approximately match. In various embodiments, the pattern characteristic may be a fuzzy hash value and the authentication pattern characteristic may be a registered fuzzy hash value from a previous registration process. The authentication component 214 may determine if the fuzzy hash value based on the received pattern characteristic matches or approximately matches (based on a probability) the registered fuzzy hash value using a fuzzy matching algorithm.

If the authentication component 214 determines that the pattern characteristic and stored data match or approximately match based on the comparison, the authentication component 214 will authenticate the user of the computing device 205. However, if the authentication component 214 determines that the pattern characteristic and stored data do not match or approximately match based on the comparison, the authentication component 214 will not authenticate the user. The user may try to authenticate himself or herself a limited number of time or an unlimited number of times.

As previously discussed, the stored data may include an authentication pattern and pattern characteristic entered during a registration process. In various embodiments, the computing device 205 may include a registration component (not shown) to register a user's authentication pattern for use. The authentication pattern may be any pattern as described above with respect to the pattern recognition component 212. The stored data including the authentication pattern and pattern characteristic may be stored in and retrieved from a secure location of the memory component 208 and/or the storage 210. In various embodiments, the stored data may be encrypted. However, in other embodiments, the stored data may be not be encrypted.

In various embodiments, the computing device 205 may include an access component 216 to lock and unlock the computing device 205 based on the outcome of the authentication process as described above. The access component 216 may receive data or instructions from the authentication component 214 and/or processor component to lock or unlock the computing device 205 for use. The access component 216 may keep the computing device 205 locked if the user is not authenticated. On the other hand, the access component 216 may unlock the device if the user is authenticated.

In some embodiments, a user may authenticate himself or herself via the process as described above. The access component 216 may unlock the computing device 205 and the user may continue to use the computing device 205 while the computing device 205 is unlocked. The processor component 214 may detect that the device is no longer being used for a period of time. During normal operation, if the period of time is greater than or equal to a locked time threshold, the access component 216 may receive data from the processor component 202 to lock the computing device 205 and require the user to re-authenticate to use the computing device 205. The locked time threshold may be any time in seconds, minutes, hours, etc., and the computing device 205 may lock if inactivity is detected longer than or equal to the locked time threshold. The locked time threshold may be set by a user or may be a default setting.

In some embodiments, once a user has been fully authenticated using the full authentication pattern and the processor component 202 detects that the device is no longer being used for a period of time, the processor component 202 may determine if the computing device 205 is in motion via a motion detection component 218. If motion is detected the device may remain in an unlocked state beyond the locked time threshold. For example, the processor component 202 may detect that the computing device 205 is no longer being used and the motion detection component 218 may detect the computing device 205 is in motion indicating that the user has stopped using the computing device 205 and is carrying it to some other location. Moreover, even if the time period from when the user stopped using the device exceeds the locked time threshold, the access component 216 receives instructions or data to keep the computing device 205 unlocked.

For example, a user may stop using the computing device 205, walk to a different location, and then immediately start using the device without re-authenticating. However, if motion is not detected and/or has ceased to be detected for a period of time longer than the locked time threshold and the user is not using the device, the carry authentication chain may be broken. As a result, the access component 216 may be instructed or may receive data to put the computing device 205 into a locked state and the user will be required to re-authenticate to use the computing device 205.

In some embodiments, the computing device 205 may include a carry authentication pattern and pattern characteristic based on the carry authentication pattern in the stored data. The carry authentication pattern and pattern characteristic may be predetermined and entered by the user during a registration process and stored as stored data. The carry authentication pattern may be a simpler form of the full authentication pattern. For example, the carry authentication pattern may be a pattern based on a user carrying the device in one hand while walking with the device. In this example, the user may place his or her fingers at particular locations while holding the device when walking. These particular locations or inputs may be registered and then recognized as the carry authentication pattern. However, the carry authentication pattern is not limited in this manner; the carry authentication may be any of the patterns as previously described or a combination thereof.

As previously discussed, the computing device 205 may include a motion detection component 218. The motion detection component 218 may be any hardware, software and/or logic to detect motion of the computing device 205. The motion detection component 218 may be one or more sensors to detect motion of the computing device 205. For example, many different types of motion detection components may be utilized in various embodiments. For example, in some embodiments, the motion detection component 218 may be defined as an accelerometer, a gyro, a mercury switch, a micro-pendulum, among other types. In other embodiments or in the same embodiment, the motion detection component 218 may include a global positioning system (GPS) circuit to determine if the computing device 205 is in motion. The motion detection component 218 may include any device or circuit that may be used to determine if the computing device 205 is in motion.

In addition, the carry authentication pattern may be used in conjunction with the motion detection component 218. In some embodiments, the carry authentication pattern will only be recognized for authentication if the motion detection component 218 detects motion or inactivity for less than the locked time threshold. If inactivity is detected for longer than or equal to the locked time threshold, the computing device 205 and access component 216 may lock the device, as previously described. While the carry authentication pattern is in use, a person may immediately begin to use the computing device 205 without having to re-authenticate.

In some embodiments, the carry authentication pattern may be the motion detected by the motion detection component 218. For example, the authentication pattern may not be how a user is holding the computing device 205 or detecting one or more inputs by the sensor component 204, but may be the motion that is being detected immediately after an authenticated user stopped using the device. For example, a user may be able to register a certain pattern recognized by the motion detection component 218 while a person is walking indicative of the persons speed, stride and/or bounce that may be unique to the user. The carry authentication pattern is independent of how a user is holding the computing device 205. Various embodiments are not limited in this manner.

In various embodiments, computing device 205 may include a display 220. Display 220 may constitute any display device capable of displaying information received from processor component 202. The display 220 may include at least one of a Liquid Crystal Display (LCD), a Thin Film Transistor-LCD (TFT-LCD), an Organic Light Emitting Diode (OLED), a flexible display, a three-dimensional (3D) display and a projector, for example. The display 220 may display a User interface (UI) or a Graphical User Interface (GUI) associated with controlling functionality of the computing device 205. The computer device may include two or more display units, according to various embodiments. For example, in one embodiment, the computing device may include two LCD displays.

Figure 3:
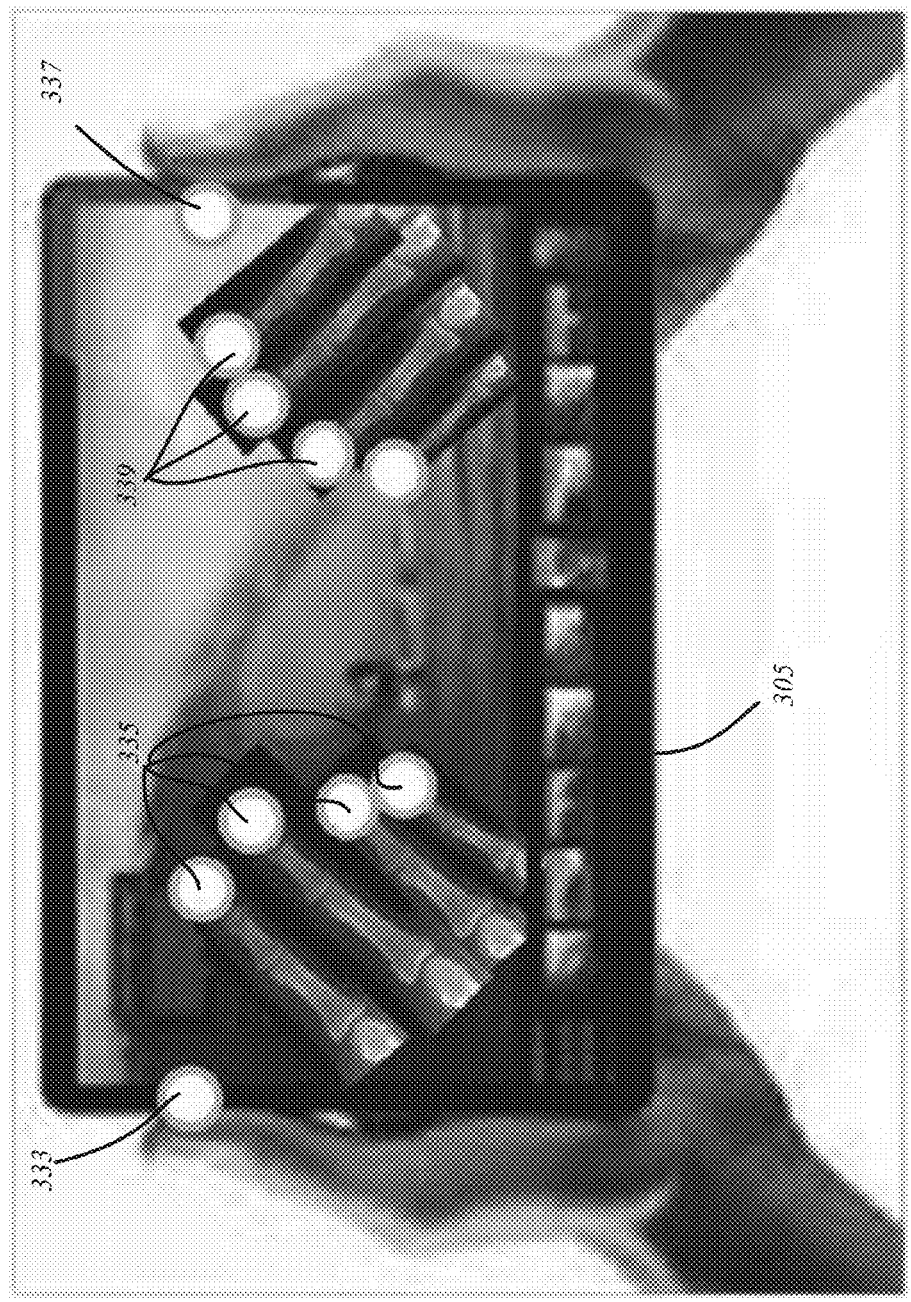
FIG. 3 illustrates an embodiment of a third computing system.

FIG. 3 illustrates an embodiment of an exemplary apparatus 300 including computing device 305 suitable for back side and front side input detection, pattern recognition, authentication and access. In various embodiments, apparatus 300 may be representative of a system or architecture suitable for use with one or more embodiments described herein, such as computing device 205 of FIG. 2. and system 100 of FIG. 1. In various embodiments, computing device 305 may include the same or similar devices and components as those described with reference to computing device 205 and may function in the same or a similar manner. As such, computing device 305 will be discussed with continuing reference to FIGS. 1 and 2.

In various embodiments, computing device 305 may include sensor component 204 arranged to detect one or more inputs. For example, FIG. 3 illustrates inputs comprising a user's fingers and thumbs detected by the sensor component 204. In this example, the user's left thumb may be detected by the sensor component 204 at input 333 and the user's left fingers may be detected by the sensor component 204 at inputs 335. The users right thumb may be detected by the sensor component 204 at input 337 and the user's right fingers may be detected at inputs 339. As illustrated, the user's fingers may be detected by the sensor component 204 on or through the back side of the computing device 305 and the user's thumbs may be detected on or through the front side of the computing device 305. Various embodiments are not limited in this manner and computing device 305 and sensor component 204 may detect the fingers and thumbs anywhere on the housing of computing device 305. In various embodiments, sensor component 204 may detect a user's input without the user contacting the housing. For example, the sensor component 204 may detect the user's fingers and/or thumbs at a particular distance away from the back side or front side of the housing. Also, the sensor component 204 may detect the user's fingers and thumbs as inputs sequentially or simultaneously. The embodiments are not limited in this respect.

The computing device 305 may also include a pattern recognition component 212 to determine a pattern or a user's unique input characteristics based on the one or more inputs received by the sensor component 204. The pattern recognition component 212 may determine a pattern based on various characteristics as described above with respect to FIG. 2. For example, the pattern recognition component 204 may determine a pattern including the size of a user's fingers or thumbs as inputs, a particular number of inputs and an order or sequence of the inputs. The pattern may also include a relative input placement with reference to particular locations on the front side or back side of the housing, a relative input placement with reference to each of the inputs (e.g. delta of coordinates of placement between inputs), inputs on the front side, and/or an amount of pressure of inputs at any location or at particular locations.

In various embodiments, the computing device 305 may also include authentication component 214 and access component 216. Once the pattern recognition component 212 determines a pattern or the unique characteristics based on one or more inputs, the authentication component 214 may authenticate a user based on a pattern characteristic of determined pattern and stored data in a similar manner as described above with reference to FIG. 2. Once the user is authenticated, the access component 216 may then unlock the computing device 305 and grant the user access to the computing device 305 for use. If the user is not authenticated, the access component 216 may keep the computing device 305 locked or lock the computing device 305 and will not grant the user access.

FIGS. 4A-4D illustrate exemplary embodiments 400 and 450 and computing device 305 receiving a plurality of inputs, determining a pattern based on the inputs, authenticating a user and granting access to the computing device 305. In various embodiments, computing device 305 may include the same or similar devices and components as those in computing device 205 and function in the same or similar manner. As such, computing device 305 will be discussed with reference to FIGS. 1 and 2.

Figures 4A, 4B:
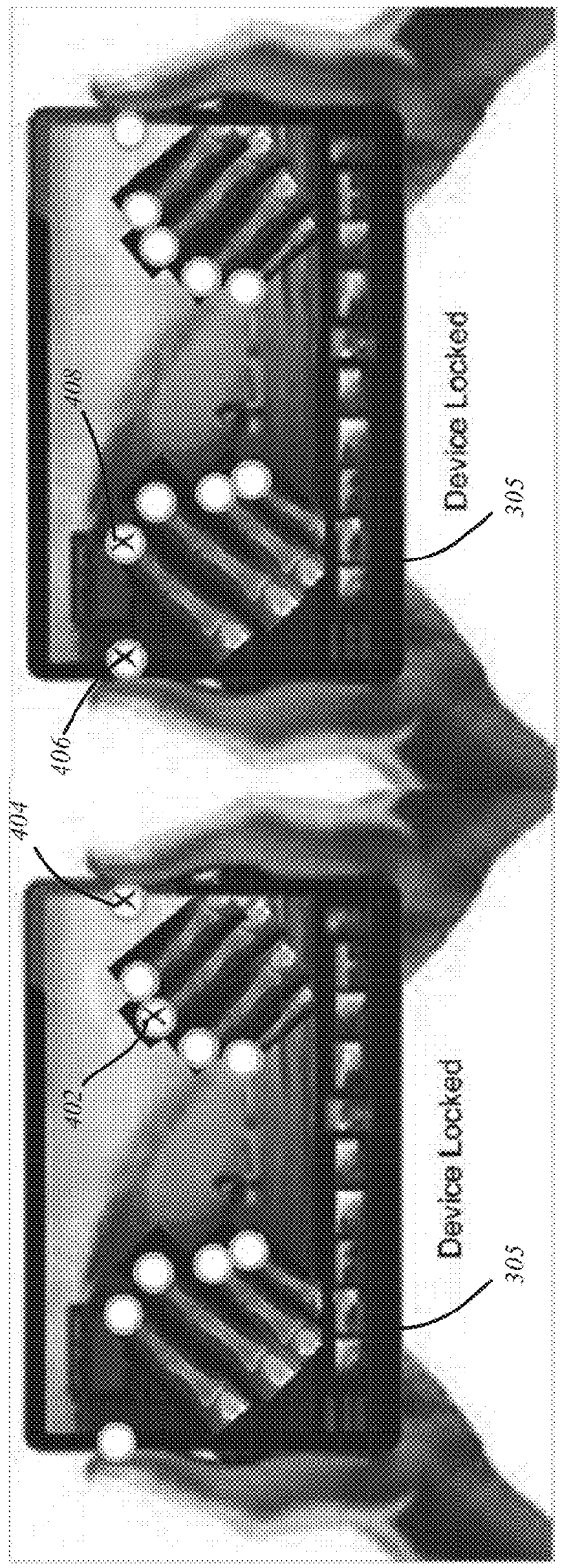

In these examples, computing device 305 may authenticate a user and unlock the computing device 305 if the correct pattern of inputs is entered by the user and detected by the sensor component 204. In FIG. 4A, the user may virtually touch their middle finger and thumb of their right hand together "through" the device. The sensor component 204 may detect an input 402 on the back side of computing device 305 and an input 404 on the front side of the device made by the user's middle finger and thumb, respectively. The user may touch the computing device 305 and the sensor component 204 may detect the inputs simultaneously on a front side and back side of the computing device 305. The user may virtually touch his or her finger and thumb together by placing the middle finger and thumb in approximately the same location on opposing sides of the device and applying pressure.

In FIG. 4B, the user may virtually touch his or her index finger and thumb of the left hand together through the computing device 305 as shown at inputs 406 and 408. As similarly discussed above, the user may virtually touch the finger and thumb together by placing the finger and thumb on opposing sides of the device in approximately the same location and applying pressure. In FIG. 4C, the user may virtually touch his or her pinky finger and thumb of the left hand together through the computing device 305 at inputs 410 and 412, respectively. Finally, at inputs 414 and 416, the user may virtually touch his or her index finger and thumb of the right hand together through the computing device 305 in FIG. 4D.

Upon completion of the above-described sequence, the pattern recognition component 212 may determine a pattern and a pattern characteristic based upon the inputs sensed by the sensor component 204. The authentication component 214 may then authenticate the user based upon the pattern and a comparison of the pattern characteristic and stored data. If the user inputted the correct sequence the access component 216 may unlock the computing device 305. However, if the user inputted the incorrect sequence the access component 216 will keep the computing device locked.

Figure 5:
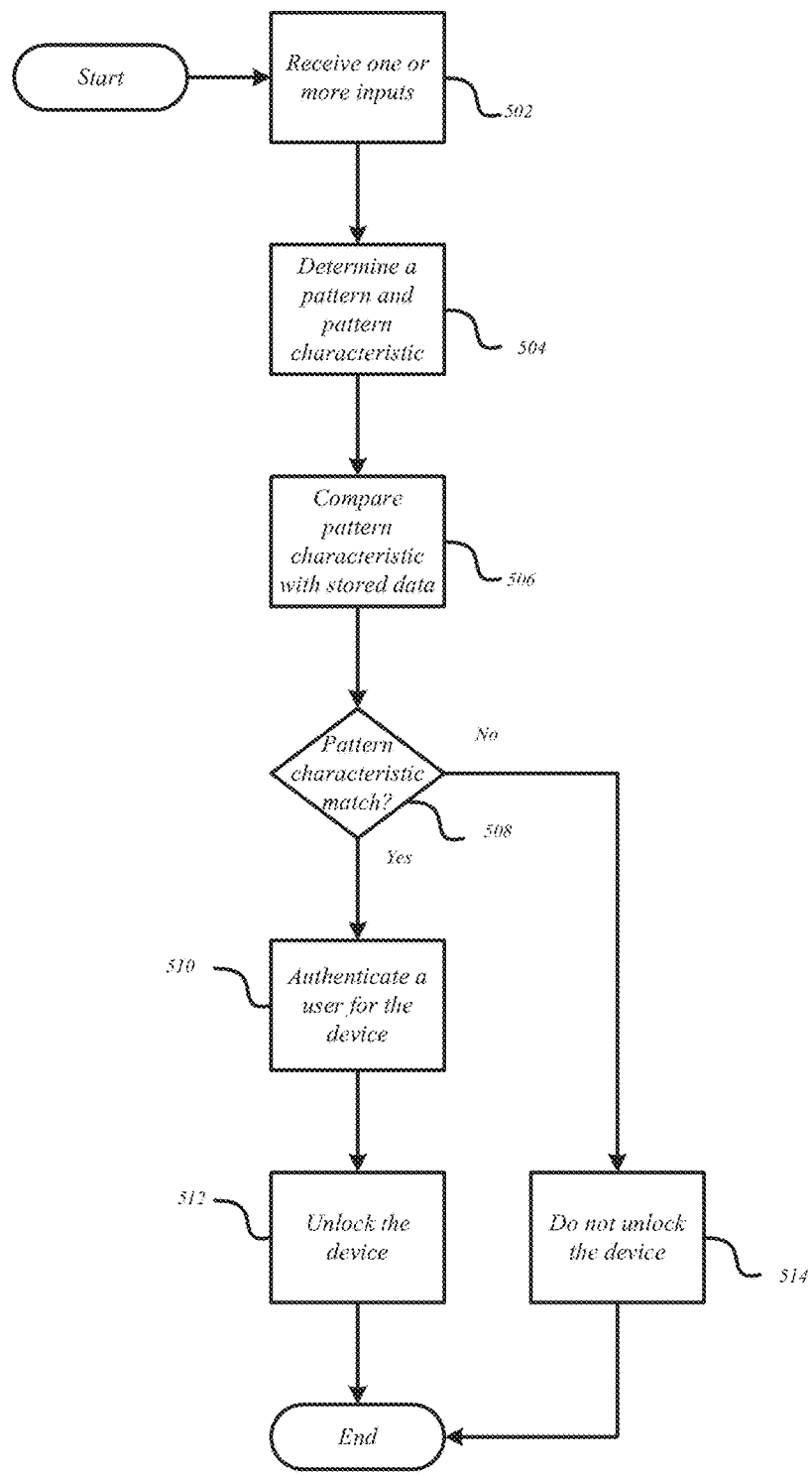
FIG. 5 illustrates an embodiment of a first logic flow.

FIG. 5 illustrates a first logic flow 500 for pattern recognition, authentication and access of a user and one or more inputs. For clarity purposes, the logic flow is discussed with reference to system 100 and system 200 of FIGS. 1 and 2. At block 502, the sensor component 204 may receive one or more inputs on a housing 122. The one or more inputs may be detected on the back side 126 and/or the front side 124 of the housing 122. For example, the sensor component 204 may detect a plurality of inputs when a user of the device picks up the computing device 205 with one or both hands. The sensor component 204 may detect any number of inputs based on the number of fingers and thumbs the user uses to pick up or touch the housing 122 of the computing device.

At block 504, a pattern recognition component 212 may determine unique characteristics including a pattern and pattern characteristic based on the sensed one or more inputs detected at block 502. As described above, the pattern may be any type of pattern or combination thereof including, but not limited, to an order of inputs, a relative position on the device of inputs, a relative distance between the inputs, an amount of pressure and/or the size of input (e.g. finger input size). The pattern characteristic may be based on the pattern and may be an alphanumeric representation of the pattern computationally determined and used for authentication. For example, the pattern characteristic may be a hash value or a fuzzy hash value determined by running the detected pattern through a fuzzy hash algorithm.

The pattern characteristic may be compared to stored data including a registered pattern characteristic at block 506. For example, the authentication component 214 may receive the pattern characteristic from the pattern recognition component 212 and the stored data from the memory component 208 and/or storage 210. The authentication component 214 may compare the received pattern characteristic with the stored data and determine if they match or approximately match at block 508. In various embodiments, the pattern characteristic may be a fuzzy hash value and the stored data may be a pattern characteristic including a registered fuzzy hash value from a registration process. The authentication component 214 may determine if the fuzzy hash value based on the received pattern characteristic matches or approximately matches (based on a probability) the registered fuzzy hash value using a fuzzy matching algorithm.

If the pattern characteristic matches or approximately matches the stored data the user is authenticated to use the computing device 205 at block 510. If the user is authenticated, the access component 216 unlocks the device at block 512. However, if the pattern characteristic does not match or approximately match the stored data and the user is not authenticated, the access component does not unlock the computing device 205 at block 514.

The computing device 205 may remain unlocked until the device 205 is not used for a period of time longer than or equal to a locked time threshold. This and other embodiments will be discussed in more detail below with respect to FIG. 6.

Figure 6:
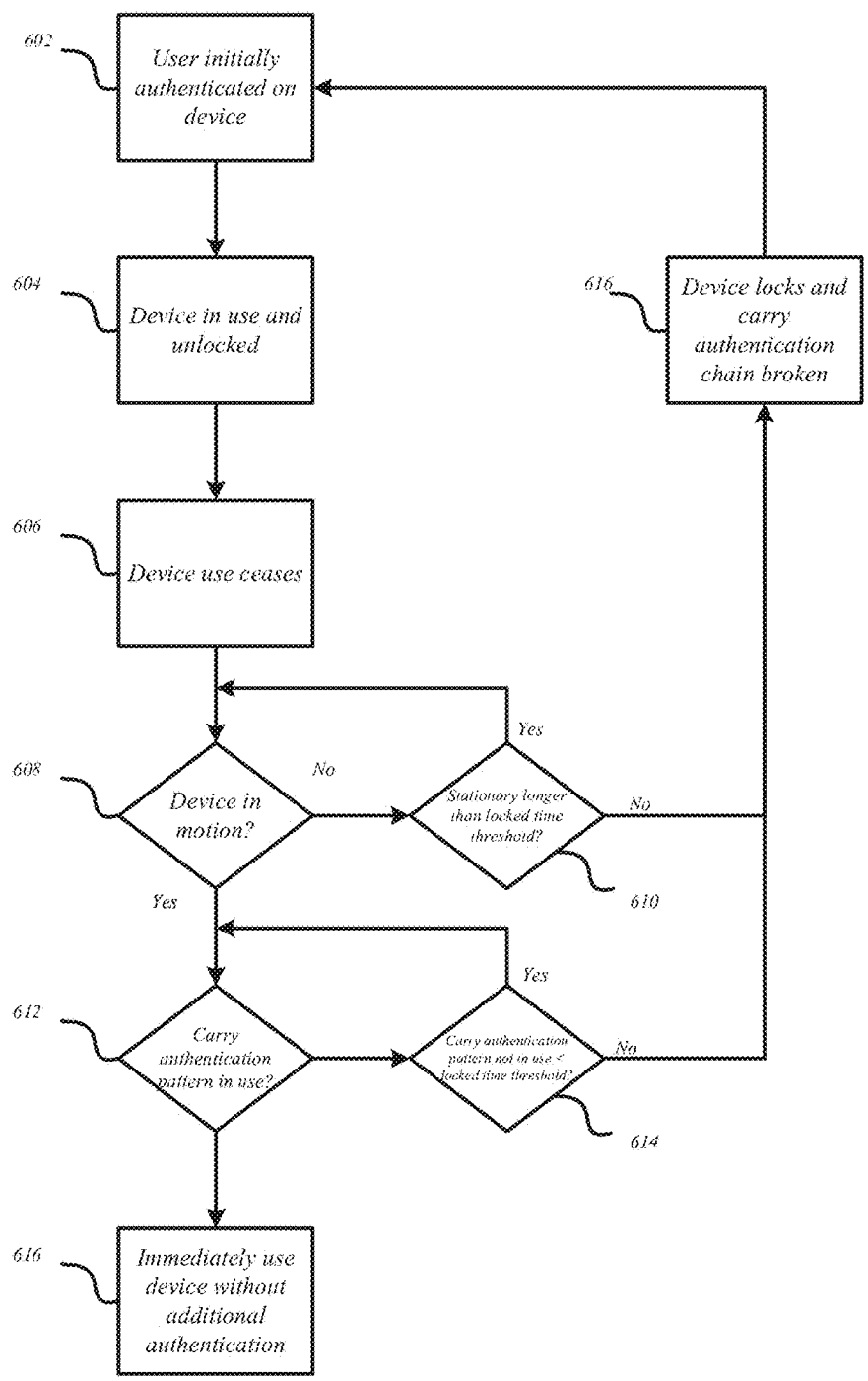
FIG. 6 illustrates an embodiment of a second logic flow.

FIG. 6 illustrates a second logic flow 600 for carry authentication. For clarity purposes, the logic flow is discussed with reference to system 100 and system 200 of FIGS. 1 and 2. At block 602, a user is initially be authenticated using the full authentication on the computing device 205 as discussed above with respect to logic flow 500. At block 604, the processor component 202 may determine if the device is unlocked and in use. The processor component 202 may determine if the computing device 205 is in use based upon activity on the computing device 202, such receiving one or more touch inputs by display 220. The processor component 202 may continuously or periodically monitor the use of the computing device 202. In various embodiments, the processor component 202 may determine that use of the device has ceased at block 606. For example, the processor component 202 may detect inactivity on the computing device 205.

At decision block 608, the processor component 202 may determine if the computing device is in motion or not in motion via the motion detection component 218. For example, the motion detection component 218 may communicate information with the processor component 202 indicating whether the motion detection component 218 detects or does not detect motion.

If motion is not detected at decision block 608, the processor component 202 may determine if the computing device 205 has been stationary for a period of time longer than or equal to a locked time threshold at decision block 610. If the processor component 202 determines that the computing device 205 has not been stationary for a period of time longer than or equal to the locked time threshold, the computing device 205 will remain unlocked and the processor component 202 will continue to monitor and detect motion of the computing device 205. However, if the processor component 202 determines that the computing device 205 has been stationary for a period of time longer than or equal to the locked time threshold, the processor component 202 and access component 216 will lock the computing device 205 and the user must fully re-authenticate for use at block 616.

If motion is detected at decision block 608, the processor component 202 may determine if a carry authentication pattern is in use at decision block 612. If at decision block 612 the processor component 202 determines that the carry authentication pattern is in use, the computing device 205 will remain unlocked while the computing device 205 is in motion and the carry authentication pattern is in use. In some instances, motion does not have to be detected for the computing device 205 to remain unlocked as long the carry authentication pattern is in use or not used for a time period less than the locked time threshold. The computing device 205 will remain unlocked even if inactivity is detected for a period of time longer than or equal to the locked time threshold if the carry authentication pattern is detected. In this instance, a user will be able to immediately be able to use the computing device 205 without any additional authentication.

If at decision block 612 the processor component 202 determines that the carry authentication pattern is not in use, the processor component 202 determines if the carry authentication pattern has not been in use for longer than or equal to the locked time threshold at decision block 614. If the carry authentication pattern has not been in use for longer than the locked time threshold, the processor component 202 and access component 216 will lock the computing device 205 at block 616. If carry authentication pattern has not been in use less than the locked time threshold, the processor component 202 will continue to monitor and determine if the carry authentication pattern begins to be used.

FIG. 7 illustrates an embodiment of a third logic flow 700. The logic flow 700 may be representative of some or all of the operations executed by one or more embodiments described herein. For example, the logic flow 600 may illustrate operations performed by the systems 100 and 200.

In the illustrated embodiment shown in FIG. 7, the logic flow 700 may include detecting one or more inputs on a back side of a housing at block 705. The one or more inputs may be detected by one or more sensor components of a computing device. The one or more inputs may be based on a user input via the user's fingers and thumb, another body part, and/or a stylus.

At block 710, the logic flow 700 may include determining a pattern based on the detected one or more inputs on the back side of the housing. For example, a pattern recognition component may determine unique characteristics including a pattern based on the one or more inputs. The pattern may be any type of pattern or combination thereof including, but not limited, to an order of inputs, a relative position of inputs on the device, a relative distance between the inputs, an amount of pressure of an input and/or the size of input (e.g. finger input size).

The logic flow 700 may also include determining a pattern characteristic based on the pattern, the pattern characteristic to represent the pattern at block 715. The pattern characteristic may be based on the pattern and may be an alphanumeric representation of the pattern computationally determined and used for authentication. For example, the pattern characteristic may be a hash value or a fuzzy hash value determined by running the detected pattern through a fuzzy hash algorithm.

At block 720, the logic flow 700 may include authenticating a user based on a comparison of the pattern characteristic and stored data. For example, the pattern characteristic may be compared with the stored data and a match or approximate match may be determined. In various embodiments, the pattern characteristic may be a fuzzy hash value and the stored data may be a registered fuzzy hash value from a registration process.

Figure 8:
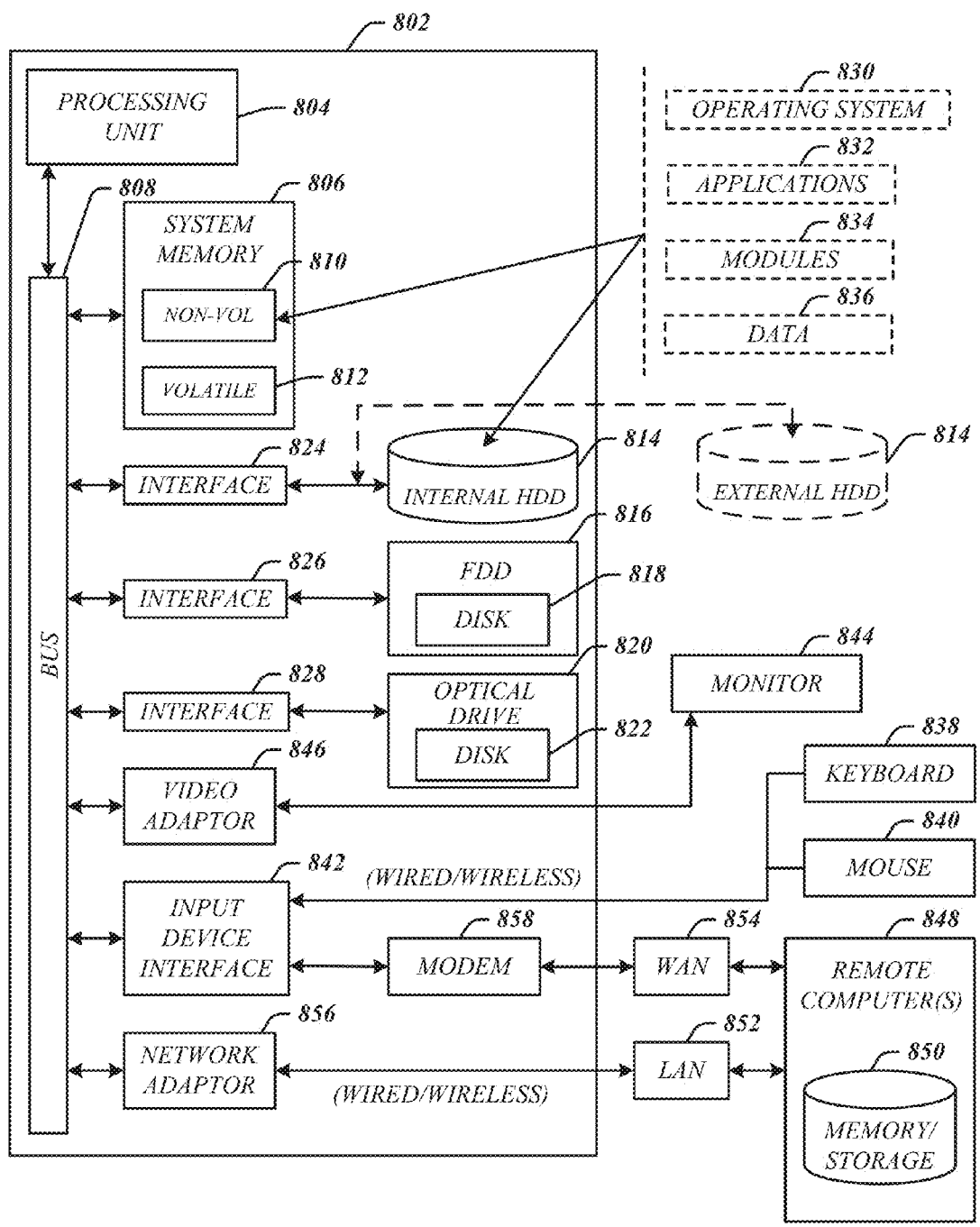
FIG. 8 illustrates an embodiment of a first computing architecture.

FIG. 8 illustrates an embodiment of an exemplary computing architecture 800 suitable for implementing various embodiments as previously described. In one embodiment, the computing architecture 800 may comprise or be implemented as part of computing device 105.

As used in this application, the terms "system" and "component" are intended to refer to a computer-related entity, either hardware, a combination of hardware and software, software, or software in execution, examples of which are provided by the exemplary computing architecture 800. For example, a component can be, but is not limited to being, a process running on a processor, a processor, a hard disk drive, multiple storage drives (of optical and/or magnetic storage medium), an object, an executable, a thread of execution, a program, and/or a computer. By way of illustration, both an application running on a server and the server can be a component. One or more components can reside within a process and/or thread of execution, and a component can be localized on one computer and/or distributed between two or more computers. Further, components may be communicatively coupled to each other by various types of communications media to coordinate operations. The coordination may involve the uni-directional or bi-directional exchange of information. For instance, the components may communicate information in the form of signals communicated over the communications media. The information can be implemented as signals allocated to various signal lines. In such allocations, each message is a signal. Further embodiments, however, may alternatively employ data messages. Such data messages may be sent across various connections. Exemplary connections include parallel interfaces, serial interfaces, and bus interfaces.

The computing architecture 800 includes various common computing elements, such as one or more processors, multi-core processors, co-processors, memory units, chipsets, controllers, peripherals, interfaces, oscillators, timing devices, video cards, audio cards, multimedia input/output (I/O) components, power supplies, and so forth. The embodiments, however, are not limited to implementation by the computing architecture 700.

As shown in FIG. 8, the computing architecture 800 comprises a processing unit 804, a system memory 806 and a system bus 808. The processing unit 804 can be any of various commercially available processors, such as those described with reference to the processor 130 shown in FIG. 1.

The system bus 808 provides an interface for system components including, but not limited to, the system memory 806 to the processing unit 804. The system bus 808 can be any of several types of bus structure that may further interconnect to a memory bus (with or without a memory controller), a peripheral bus, and a local bus using any of a variety of commercially available bus architectures. Interface adapters may connect to the system bus 808 via slot architecture. Example slot architectures may include without limitation Accelerated Graphics Port (AGP), Card Bus, (Extended) Industry Standard Architecture ((E)ISA), Micro Channel Architecture (MCA), NuBus, Peripheral Component Interconnect (Extended) (PCI(X)), PCI Express, Personal Computer Memory Card International Association (PCMCIA), and the like.

The computing architecture 700 may comprise or implement various articles of manufacture. An article of manufacture may comprise a computer-readable storage medium to store logic. Examples of a computer-readable storage medium may include any tangible media capable of storing electronic data, including volatile memory or non-volatile memory, removable or non-removable memory, erasable or non-erasable memory, writeable or re-writeable memory, and so forth. Examples of logic may include executable computer program instructions implemented using any suitable type of code, such as source code, compiled code, interpreted code, executable code, static code, dynamic code, object-oriented code, visual code, and the like. Embodiments may also be at least partly implemented as instructions contained in or on a non-transitory computer-readable medium, which may be read and executed by one or more processors to enable performance of the operations described herein.

The system memory 806 may include various types of computer-readable storage media in the form of one or more higher speed memory units, such as read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory, polymer memory such as ferroelectric polymer memory, ovonic memory, phase change or ferroelectric memory, silicon-oxide-nitride-oxide-silicon (SONOS) memory, magnetic or optical cards, an array of devices such as Redundant Array of Independent Disks (RAID) drives, solid state memory devices (e.g., USB memory, solid state drives (SSD) and any other type of storage media suitable for storing information. In the illustrated embodiment shown in FIG. 7, the system memory 806 can include non-volatile memory 810 and/or volatile memory 812. A basic input/output system (BIOS) can be stored in the non-volatile memory 810.

The computer 802 may include various types of computer-readable storage media in the form of one or more lower speed memory units, including an internal (or external) hard disk drive (HDD) 814, a magnetic floppy disk drive (FDD) 816 to read from or write to a removable magnetic disk 818, and an optical disk drive 820 to read from or write to a removable optical disk 822 (e.g., a CD-ROM or DVD). The HDD 814, FDD 816 and optical disk drive 820 can be connected to the system bus 808 by a HDD interface 824, an FDD interface 826 and an optical drive interface 828, respectively. The HDD interface 824 for external drive implementations can include at least one or both of Universal Serial Bus (USB) and IEEE 1394 interface technologies.

The drives and associated computer-readable media provide volatile and/or nonvolatile storage of data, data structures, computer-executable instructions, and so forth. For example, a number of program modules can be stored in the drives and memory units 810, 812, including an operating system 830, one or more application programs 832, other program modules 834, and program data 836. In one embodiment, the one or more application programs 832, other program modules 834, and program data 836 can include, for example, the various applications and/or components of the system 100.

A user can enter commands and information into the computer 802 through one or more wire/wireless input devices, for example, a keyboard 838 and a pointing device, such as a mouse 840. Other input devices may include microphones, infra-red (IR) remote controls, radio-frequency (RF) remote controls, game pads, stylus pens, card readers, dongles, finger print readers, gloves, graphics tablets, joysticks, keyboards, retina readers, touch screens (e.g., capacitive, resistive, etc.), trackballs, trackpads, sensors, styluses, and the like. These and other input devices are often connected to the processing unit 804 through an input device interface 842 that is coupled to the system bus 808, but can be connected by other interfaces such as a parallel port, IEEE 1394 serial port, a game port, a USB port, an IR interface, and so forth.

A monitor 844 or other type of display device is also connected to the system bus 808 via an interface, such as a video adaptor 846. The monitor 844 may be internal or external to the computer 802. In addition to the monitor 844, a computer typically includes other peripheral output devices, such as speakers, printers, and so forth.

The computer 802 may operate in a networked environment using logical connections via wire and/or wireless communications to one or more remote computers, such as a remote computer 848. The remote computer 848 can be a workstation, a server computer, a router, a personal computer, portable computer, microprocessor-based entertainment appliance, a peer device or other common network node, and typically includes many or all of the elements described relative to the computer 802, although, for purposes of brevity, only a memory/storage device 850 is illustrated. The logical connections depicted include wire/wireless connectivity to a local area network (LAN) 852 and/or larger networks, for example, a wide area network (WAN) 854. Such LAN and WAN networking environments are commonplace in offices and companies, and facilitate enterprise-wide computer networks, such as intranets, all of which may connect to a global communications network, for example, the Internet.

When used in a LAN networking environment, the computer 802 is connected to the LAN 852 through a wire and/or wireless communication network interface or adaptor 856. The adaptor 856 can facilitate wire and/or wireless communications to the LAN 852, which may also include a wireless access point disposed thereon for communicating with the wireless functionality of the adaptor 856.

When used in a WAN networking environment, the computer 802 can include a modem 758, or is connected to a communications server on the WAN 854, or has other means for establishing communications over the WAN 854, such as by way of the Internet. The modem 758, which can be internal or external and a wire and/or wireless device, connects to the system bus 808 via the input device interface 842. In a networked environment, program modules depicted relative to the computer 802, or portions thereof, can be stored in the remote memory/storage device 850. It will be appreciated that the network connections shown are exemplary and other means of establishing a communications link between the computers can be used.

The computer 802 is operable to communicate with wire and wireless devices or entities using the IEEE 802 family of standards, such as wireless devices operatively disposed in wireless communication (e.g., IEEE 802.11 over-the-air modulation techniques). This includes at least Wi-Fi (or Wireless Fidelity), WiMax, and Bluetooth™ wireless technologies, among others. Thus, the communication can be a predefined structure as with a conventional network or simply an ad hoc communication between at least two devices. Wi-Fi networks use radio technologies called IEEE 802.11x (a, b, g, n, etc.) to provide secure, reliable, fast wireless connectivity. A Wi-Fi network can be used to connect computers to each other, to the Internet, and to wire networks (which use IEEE 802.3-related media and functions).

The various elements of the touch gesture recognition system 100 as previously described with reference to FIGS. 1-7 may comprise various hardware elements, software elements, or a combination of both. Examples of hardware elements may include devices, logic devices, components, processors, microprocessors, circuits, processors, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), memory units, logic gates, registers, semiconductor device, chips, microchips, chip sets, and so forth. Examples of software elements may include software components, programs, applications, computer programs, application programs, system programs, software development programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. However, determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given implementation.

The detailed disclosure now turns to providing examples that pertain to further embodiments. Examples one through forty-two (1-42) provided below are intended to be exemplary and non-limiting.

In a first example, an apparatus may comprise a housing comprising a front side and back side, a sensor component to detect one or more inputs on the back side of the housing opposite a display, a pattern recognition component to determine a pattern based on the detected one or more inputs and a pattern characteristic based on the pattern, and an authentication component to authenticate a user based on a comparison of the pattern characteristic and stored data.

In a second example and in furtherance of the pervious example, an apparatus may comprise a pattern further comprising at least one of an order of the one or more inputs, a relative placement of the one or more inputs, a distance between the one or more inputs, and a pressure of the one or more inputs, and the authentication component to authenticate based on the pattern characteristic of the pattern or combination of patterns.

In a third example and in furtherance of any of the previous examples, an apparatus may comprise a sensor component to detect one or more inputs on the front side of the housing, and an authentication component to authenticate the user based on the comparison of the pattern characteristic of the detected one or more inputs on the back side and the detected one or more inputs on the front side, and the stored data.

In a fourth example and in furtherance of any of the previous examples, an apparatus may comprise an authentication component to authenticate based on the pattern characteristic of the detected one or more inputs on the back side of the housing at a first location and the detected one or more inputs on a front side of the housing at a second location.

In a fifth example and in furtherance of any of the previous examples, the apparatus may comprise may comprise an authentication component to authenticate based on the pattern characteristic of the detected one or more inputs on the back side of the housing at a first location and the detected one or more inputs on a front side of the housing at a second location, wherein the one or more inputs on the back side of the housing and the one or more inputs on the front side of the housing occur substantially simultaneously.

In a sixth example and in furtherance of any of the previous examples, the apparatus may comprise an authentication component to authenticate based on the pattern characteristic of a degree of pressure of the one or more inputs at one or more locations on the back side of the housing corresponding to the one or more inputs.

In a seventh example and in furtherance of any of the previous examples, the apparatus may comprise an authentication component to authenticate based on the comparison of the pattern characteristic having a fuzzy hash and stored data having a registered fuzzy hash using a fuzzy match algorithm.

In an eighth example and in furtherance of any of the previous examples, the apparatus may comprise an access component to unlock the apparatus for use based on the authentication.

In a ninth example and in furtherance of any of the previous examples, the apparatus may comprise pattern recognition component to detect a carry pattern to authenticate the user that has already been fully authenticated, a motion detection device, and an access component to unlock the apparatus for use if the user is authenticated and maintain the apparatus in an unlocked state while motion is detected by the motion detection device and the carry pattern is detected.

In a tenth example and in furtherance of any of the previous examples, an apparatus may comprise an access component to maintain the apparatus in the unlocked state beyond a locked time threshold while motion is detected and the carry pattern is detected.

In an eleventh example and in furtherance of any of the previous examples, an apparatus may comprise an access component to lock the apparatus if one or more of the motion is no longer detected, the carry pattern is no longer detected and a locked time threshold has been surpassed.

In a twelfth example and in furtherance of any of the previous examples, an apparatus may comprise a sensor component comprising at least one of a biometric sensor, a thermal sensor, an image sensor, a video sensor, a touch sensor and a capacitive sensor.

In a thirteenth example and in furtherance of any of the previous examples, at least one computer readable storage medium having instructions stored thereon, the instructions when executed on a machine to detect one or more inputs on a back side of a housing, determine a pattern based on the detected one or more inputs on the back side of the housing, determine a pattern characteristic based on the pattern and authenticate a user based on a comparison of the pattern characteristic and stored data.

In a fourteenth example and in furtherance of any of the previous examples, at least one computer readable storage medium having instructions stored thereon, the instructions when executed on a machine to determine the pattern of an order in which the one or more inputs are detected on the back side of the housing and authenticate based on the pattern characteristic of the pattern.

In a fifteenth example and in furtherance of any of the previous examples, at least one computer readable storage medium having instructions stored thereon, the instructions when executed on a machine to determine the pattern of a relative distance between the one or more inputs detected on the back side of the housing and authenticate based on the pattern characteristic of the pattern.

In a sixteenth example and in furtherance of any of the previous examples, at least one computer readable storage medium having instructions stored thereon, the instructions when executed on a machine to determine the pattern of a degree of pressure at a location of each of the one or more inputs detected on the backside of the housing and authenticate based on the pattern characteristic of the pattern.

In a seventeenth example and in furtherance of any of the previous examples, at least one computer readable storage medium having instructions stored thereon, the instructions when executed on a machine to determine the pattern of a relative placement of the one or more inputs on the back side of the housing and authenticate based on the pattern characteristic of the pattern.

In an eighteenth example and in furtherance of any of the previous examples, at least one computer readable storage medium having instructions stored thereon, the instructions when executed on a machine to determine the pattern of a combination of two or more of an order of the one or more inputs, a relative placement of the one or more inputs, a distance between the one or more inputs, and a pressure of the one or more inputs and authenticate based on the pattern characteristic of the pattern.

In a nineteenth example and in furtherance of any of the previous examples, at least one computer readable storage medium having instructions stored thereon, the instructions when executed on a machine to unlock if the user is authenticated based on the comparison of the pattern characteristic and the stored data.

In a twentieth example and in furtherance of any of the previous examples, at least one computer readable storage medium having instructions stored thereon, the instructions when executed on a machine to unlock for use if the user is authenticated, detect a carry pattern to authenticate the user that has already been fully authenticated and maintain an unlocked state while motion is detected by a motion detection device and the carry pattern is detected.

In a twenty-first example and in furtherance of any of the previous examples, at least one computer readable storage medium having instructions stored thereon, the instructions when executed on a machine to maintain the unlocked state beyond a locked time threshold while motion is detected and the carry pattern is detected.

In a twenty-second example and in furtherance of any of the previous examples, at least one computer readable storage medium having instructions stored thereon, the instructions when executed on a machine to lock if one or more of the motion is no longer detected, the carry pattern is no longer detected, and a locked time threshold has been surpassed.

In a twenty-third example and in furtherance of any of the previous examples, a computer-implemented method may comprise detecting one or more inputs on a back side of a housing, determining a pattern based on the detected one or more inputs on the back side of the housing, determining a pattern characteristic based on the pattern and authenticating a user based on a comparison of the pattern characteristic and stored data.

In a twenty-fourth example and in furtherance of any of the previous examples, a computer-implemented method may comprise determining the pattern of an order in which the one or more inputs are detected on the back side of the housing and authenticating based on the pattern characteristic of the pattern.

In a twenty-fifth example and in furtherance of any of the previous examples, a computer-implemented method may comprise determining the pattern of a relative distance between the one or more inputs detected on the back side of the housing and authenticating based on the pattern characteristic of the pattern.

In a twenty-sixth example and in furtherance of any of the previous examples, a computer-implemented method may comprise determining the pattern of a degree of pressure at a location of each of the one or more inputs detected on the backside of the housing and authenticating based on the pattern characteristic of the pattern.

In a twenty-seventh example and in furtherance of any of the previous examples, a computer-implemented method may comprise determining the pattern of a relative placement of the one or more inputs on the back side of the housing and authenticating based on the pattern characteristic of the pattern.

In a twenty-eighth example and in furtherance of any of the previous examples, a computer-implemented method may comprise determining the pattern of a combination of two or more of an order of the one or more inputs, a relative placement of the one or more inputs, a distance between the one or more inputs, and a pressure of the one or more inputs and authenticating based on the pattern characteristic of the pattern.

In a twenty-ninth example and in furtherance of any of the previous examples, a computer-implemented method may comprise unlocking the computing device if the user is authenticated based on the comparison of the pattern characteristic and the stored data.

In a thirtieth example and in furtherance of any of the previous examples, a computer-implemented method may comprise unlocking the computing device for use if the user is authenticated, detecting a carry pattern to authenticate the user that has already been fully authenticated and maintaining an unlocked state while motion is detected by a motion detection device and the carry pattern detected.

In a thirty-first example and in furtherance of any of the previous examples, a computer-implemented method may comprise maintaining the unlocked state beyond a locked time threshold while the carry authentication pattern is detected and the carry pattern is detected.

In a thirty-second example and in furtherance of any of the previous examples, a computer-implemented method may comprise locking the computing device if one or more of the motion is not detected, the carry pattern is not detected and a locked time threshold has been surpassed.

In a thirty-third example and in furtherance of any of the previous examples, an apparatus may comprise means for detecting one or more inputs on a back side of a housing, means for determining a pattern based on the detected one or more inputs on the back side of the housing, means for determining a pattern characteristic based on the pattern and means for authenticating a user based on a comparison of the pattern characteristic and stored data.

In a thirty-fourth example and in furtherance of any of the previous examples, an apparatus may comprise means for determining the pattern of an order in which the one or more inputs are detected on the back side of the housing and means for authenticating based on the pattern characteristic of the pattern.

In a thirty-fifth example and in furtherance of any of the previous examples, an apparatus may comprise means for determining the pattern of a relative distance between the one or more inputs detected on the back side of the housing and means for authenticating based on the pattern characteristic of the pattern.

In a thirty-sixth example and in furtherance of any of the previous examples, an apparatus may comprise means for determining the pattern of a degree of pressure at a location of each of the one or more inputs detected on the backside of the housing and means for authenticating based on the pattern characteristic of the pattern.

In a thirty-seventh example and in furtherance of any of the previous examples, an apparatus may comprise means for determining the pattern of a relative placement of the one or more inputs on the back side of the housing and means for authenticating based on the pattern characteristic of the pattern.

In a thirty-eightieth example and in furtherance of any of the previous examples, an apparatus may comprise means for determining the pattern of a combination of two or more of an order of the one or more inputs, a relative placement of the one or more inputs, a distance between the one or more inputs, and a pressure of the one or more inputs and means for authenticating based on the pattern characteristic of the pattern.

In a thirty-ninth example and in furtherance of any of the previous examples, an apparatus may comprise means for unlocking the computing device if the user is authenticated based on the comparison of the pattern characteristic and the stored data.

In a fortieth example and in furtherance of any of the previous examples, an apparatus may comprise means for unlocking the computing device for use if the user is authenticated, means for detecting a carry pattern to authenticate the user that has already been fully authenticated and means for maintaining an unlocked state while motion is detected by a motion detection device and the carry pattern detected.

In a forty-first example and in furtherance of any of the previous examples, an apparatus may comprise means for maintaining the unlocked state beyond a locked time threshold while the carry authentication pattern is detected and the carry pattern is detected.

In a forty-second example and in furtherance of any of the previous examples, an apparatus may comprise means for locking the computing device if one or more of the motion is not detected, the carry pattern is not detected and a locked time threshold has been surpassed.

Some embodiments may be described using the expression "one embodiment" or "an embodiment" along with their derivatives. These terms mean that a particular feature, structure, or characteristic described in connection with the embodiment is included in at least one embodiment. The appearances of the phrase "in one embodiment" in various places in the specification are not necessarily all referring to the same embodiment. Further, some embodiments may be described using the expression "coupled" and "connected" along with their derivatives. These terms are not necessarily intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still co-operate or interact with each other.

It is emphasized that the Abstract of the Disclosure is provided to allow a reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment. In the appended claims, the terms "including" and "in which" are used as the plain-English equivalents of the respective terms "comprising" and "wherein," respectively. Moreover, the terms "first," "second," "third," and so forth, are used merely as labels, and are not intended to impose numerical requirements on their objects.

What has been described above includes examples of the disclosed architecture. It is, of course, not possible to describe every conceivable combination of components and/or methodologies, but one of ordinary skill in the art may recognize that many further combinations and permutations are possible. Accordingly, the novel architecture is intended to embrace all such alterations, modifications and variations that fall within the spirit and scope of the appended claims.

What is claimed is:

1. An apparatus, comprising:
a housing comprising a front side and back side;
a sensor component to detect two or more inputs on the back side of the housing;
a pattern recognition component communicatively coupled to the sensor component, the pattern recognition component to determine a pattern based on the detected two or more inputs and a pattern characteristic based on the pattern, the pattern comprising placement on the back side of the housing of at least two inputs of the two or more inputs relative to each other, the at least two inputs of the two or more inputs to occur substantially simultaneously;
an authentication component communicatively coupled to the pattern recognition component, the authentication component to authenticate a user based on a comparison of the pattern characteristic and stored data;
an access component communicatively coupled to the authentication component, the access component to unlock the apparatus for use based on the authentication, the access component to determine use of the apparatus has ceased;
a motion detection component communicatively coupled to the access component, the motion detection component to determine the apparatus is in motion in response to the determination the use of the apparatus has ceased, the pattern recognition component to determine whether a carry pattern is present in response to the determination the apparatus is in motion, the carry pattern based on placement of one or more fingers of the user at particular locations on the apparatus, the access component to lock the apparatus when the carry pattern is not present for a period of time longer than or equal to a locked time threshold and the access component to keep the apparatus unlocked for a period of time longer than or equal to the locked time threshold when the carry pattern is present.

2. The apparatus of claim 1, the pattern comprising at least one of an order of the two or more inputs, a relative placement of the two or more inputs, a distance between the two or more inputs, and a pressure of the two or more inputs, and the authentication component to authenticate based on the pattern characteristic of the pattern or combination of patterns.

3. The apparatus of claim 1, the sensor component to detect one or more inputs on the front side of the housing, and the authentication component to authenticate the user based on the comparison of the pattern characteristic of the detected two or more inputs on the back side and the detected one or more inputs on the front side, and the stored data.

4. The apparatus of claim 3, the authentication component to authenticate based on the pattern characteristic of the detected two or more inputs on the back side of the housing at a first location and the detected one or more inputs on the front side of the housing at a second location.

5. The apparatus of claim 3, the two or more inputs on the back side of the housing and the one or more inputs on the front side of the housing occur substantially simultaneously.

6. The apparatus of claim 1, the authentication component to authenticate based on the pattern characteristic of a degree of pressure of the two or more inputs at two or more locations on the back side of the housing corresponding to the two or more inputs.

7. The apparatus of claim 1, the authentication component to authenticate based on the comparison of the pattern characteristic having a fuzzy hash and stored data having a registered fuzzy hash using a fuzzy match algorithm.

8. The apparatus of claim 1, the access component to lock the apparatus when one or more of the motion is no longer detected, the carry pattern is no longer detected and the locked time threshold has been surpassed.

9. The apparatus of claim 1, comprising:
a display positioned on the front side of the housing and the sensor component positioned on the back side of the housing.

10. An article comprising a non-transitory computer-readable storage medium comprising instructions that when executed enable a computing device to:
detect two or more inputs on a back side of a housing;
determine a pattern based on the detected two or more inputs on the back side of the housing, the pattern comprising placement on the back side of the housing of at least two inputs of the two or more inputs relative to each other, the at least two inputs of the two or more inputs to occur substantially simultaneously;
determine a pattern characteristic based on the pattern;
authenticate a user based on a comparison of the pattern characteristic and stored data;
unlock the computing device for use based on the authentication;
determine use of the computing device has ceased;

determine the computing device is in motion in response to the determination the use of the computing device has ceased;

determine whether a carry pattern is present in response to the determination the computing device is in motion, the carry pattern based on placement of one or more fingers of the user at particular locations on the computing device; and lock the computing device when the carry pattern is not present for a period of time longer than or equal to a locked time threshold and keep the computing device unlocked for a period of time longer than or equal to the locked time threshold when the carry pattern is present.

11. The article of claim 10, comprising instructions that when executed enable the computing device to:

determine the pattern of an order in which the two or more inputs are detected on the back side of the housing; and authenticate based on the pattern characteristic of the pattern.

12. The article of claim 10, comprising instructions that when executed enable the computing device to:

determine the pattern of a relative distance between the two or more inputs detected on the back side of the housing; and authenticate based on the pattern characteristic of the pattern.

13. The article of claim 10, comprising instructions that when executed enable the computing device to:

determine the pattern of a degree of pressure at a location of each of the two or more inputs detected on the back side of the housing; and authenticate based on the pattern characteristic of the pattern.

14. The article of claim 10, comprising instructions that when executed enable the computing device to:

determine the pattern of a relative placement of the two or more inputs on the back side of the housing; and authenticate based on the pattern characteristic of the pattern.

15. The article of claim 10, comprising instructions that when executed enable the computing device to:

determine the pattern of a combination of two or more of an order of the two or more inputs, a relative placement of the two or more inputs, a distance between the two or more inputs, and a pressure of the two or more inputs; and authenticate based on the pattern characteristic of the pattern.

16. The article of claim 10, comprising instructions that when executed cause a computing device to lock when one or more of the motion is no longer detected, the carry pattern is no longer detected, and the locked time threshold has been surpassed.

17. A computer-implemented method, comprising:

detecting two or more inputs on a back side of a housing;

determining a pattern based on the detected two or more inputs on the back side of the housing, the pattern comprising placement on the back side of the housing of at least two inputs of the two or more inputs relative to each other, the at least two inputs of the two or more inputs to occur substantially simultaneously;

determining a pattern characteristic based on the pattern;

authenticating a user based on a comparison of the pattern characteristic and stored data;

unlocking a computing device for use based on the authentication;

determining use of the computing device has ceased;

determining the computing device is in motion in response to the determination the use of the computing device has ceased;

determining whether a carry pattern is present in response to the determination the computing device is in motion, the carry pattern based on placement of one or more fingers of the user at particular locations on the computing device; and locking the computing device when the carry pattern is not present for a period of time longer than or equal to a locked time threshold and keep the computing device unlocked for a period of time longer than or equal to the locked time threshold when the carry pattern is present.

18. The computer-implemented method of claim 17, comprising:

determining the pattern of an order in which the two or more inputs are detected on the back side of the housing; and authenticating based on the pattern characteristic of the pattern.

19. The computer-implemented method of claim 17, comprising:

determining the pattern of a relative distance between the two or more inputs detected on the back side of the housing; and authenticating based on the pattern characteristic of the pattern.

\* \* \* \* \*